United States Patent [19]

Puhe et al.

[11] 4,348,496

[45] Sep. 7, 1982

[54] CARBOXYLATED MONOMER/VINYL CHLORIDE/VINYL ACETATE TERPOLYMER EMULSIONS, PROCESS OF PRODUCTION AND USE

[75] Inventors: Rudolf Puhe; Werner Frey; Günter Weinhold, all of Burghausen, Fed. Rep. of Germany

[73] Assignee: Wacker-Chemie GmbH, Munich, Fed. Rep. of Germany

[21] Appl. No.: 228,453

[22] Filed: Jan. 26, 1981

[30] Foreign Application Priority Data

Mar. 10, 1980 [DE] Fed. Rep. of Germany ....... 3009148

[51] Int. Cl.$^3$ .......................... C08K 5/11; C08K 5/12; C08K 5/52
[52] U.S. Cl. .................................... 524/127; 428/290; 428/442; 428/463; 428/475.8; 428/483; 428/511; 428/516; 524/293; 524/314; 524/315; 526/80; 526/317; 526/318; 526/336; 526/344.2
[58] Field of Search ...................... 260/30.6 R, 31.8 R

[56] References Cited

U.S. PATENT DOCUMENTS

| | | | |
|---|---|---|---|
| 3,208,965 | 9/1965 | Kuhne | 260/30.6 R |
| 3,255,132 | 6/1966 | Reinecke | 260/30.6 R |
| 3,624,051 | 11/1971 | Bauer et al. | 526/216 |
| 3,632,562 | 1/1972 | Beier et al. | 260/31.8 R |
| 3,883,494 | 5/1975 | Winter et al. | 260/31.8 R |
| 4,115,640 | 9/1978 | Kalka | 260/31.8 R |

FOREIGN PATENT DOCUMENTS

| | | |
|---|---|---|
| 609934 | 5/1962 | Belgium . |
| 1645672 | 9/1970 | Fed. Rep. of Germany . |
| 1770901 | 2/1972 | Fed. Rep. of Germany . |
| 1745561 | 3/1974 | Fed. Rep. of Germany . |
| 2262675 | 9/1975 | France . |
| 273079 | 1/1951 | Switzerland . |
| 316163 | 9/1956 | Switzerland . |
| 1488415 | 10/1977 | United Kingdom . |

*Primary Examiner*—Stanford M. Levin
*Attorney, Agent, or Firm*—Hammond & Littell, Weissenberger and Muserlian

[57] ABSTRACT

A pastable emulsion polymer comprised of carboxylated monomer/vinyl chloride/vinyl acetate terpolymer having improved strength of adhesion produced by emulsion copolymerization and containing, per polymer weight, from 60% to 98% by weight of vinyl chloride monomer units, from 1% to 29% by weight of vinyl acetate monomer units, and from 1% to 15% by weight of carboxyl-containing monomer units selected from the group consisting of olefinically-unsaturated monocarboxylic acids, monoallyl esters of non-ethylenically unsaturated dicarboxylic acids, and monovinyl esters of non-ethylenically-unsaturated dicarboxylic acids. The terpolymers are manufactured by the copolymerization of vinyl chloride, vinyl acetate, olefinically-unsaturated monocarboxylic acids and/or monoallyl esters and/or monovinyl esters of non-ethylenically unsaturated dicarboxylic acids in an aqueous emulsion. The pastable terpolymers, after empasting are used for coating flexible sheet-like articles.

7 Claims, No Drawings

CARBOXYLATED MONOMER/VINYL CHLORIDE/VINYL ACETATE TERPOLYMER EMULSIONS, PROCESS OF PRODUCTION AND USE

BACKGROUND OF THE INVENTION

The present invention relates to a pastable emulsion polymer comprised of carboxylated monomer/vinyl chloride/vinyl acetate terpolymer having improved strength of adhesion produced by emulsion copolymerization and containing, per polymer weight, from 60% to 98% by weight of vinyl chloride monomer units, from 1% to 29% by weight of vinyl acetate monomer units, and from 1% to 15% by weight of carboxyl-containing monomer units selected from the group consisting of olefinically-unsaturated monocarboxylic acids, monoallyl esters of non-ethylenically-unsaturated dicarboxylic acids, and monovinyl esters of non-ethylenically-unsaturated dicarboxylic acids. Preferably the pastable emulsion polymer contains from 78% to 97% by weight of vinyl chloride monomer units and from 2% to 10% by weight of said carboxyl-containing monomer units.

Hereinafter vinyl chloride will sometimes be referred to as VC and vinyl acetate, as VAC.

According to the ivention, olefinically-unsaturated monocarboxylic acids or monoallyl or monovinyl esters of non-ethylenically-unsaturated dicarboxylic acids are used as monomers containing carboxyl groups.

The emulsion polymer according to the invention can be processed, preferably in a manner known per se, to form plastisols, vinyl chloride pastes, and dispersions of pulverulent pastable PVC or of vinyl chloride copolymers in suitable plasticizers.

Pastable VC/VAC/maleic anhydride terpolymers, for example, have been described in DE-AS No. 16 45 672 and DE-AS No. 17 45 561, corresponding respectively to U.S. Pat. Nos. 3,632,562 and 3,624,051. Compared with the terpolymers described in those Auslegeschriften, which are applied in the form of a paste to fabrics, the terpolymers according to the invention--even those having a relatively low content of carboxyl groups, surprisingly have improved adhesive strength when used as pastes for coating flexible sheet-like articles, especially of plastics or natural materials, such as, for example, preferably films and woven or non-woven fibre products, such as textiles, fibre fleeces, paper and pasteboard. Moreover, the terpolymers according to the invention can be manufactured in a considerably shorter time with better yields than can the previously known terpolymers.

Terpolymers of vinyl chloride, vinyl acetate and a further, carboxyl group-containing, comonomer, which exhibit improved adhesion to metal, are described in Swiss CH-PS Nos. 316 163 and 273 079 and Belgium BE-PS No. 609 934. Those polymers can, however, because of their molecular structure and their outer form which results from their manufacture in suspension, solution or emulsion with subsequent precipitation by coagulation, be processed only as solutions in organic solvents, for example ketones, carboxylic acid esters and the like. Their use is therefore mainly in the field of lacquers. The coating of flexible sheet-like articles with lacquer solutions of this type is technically complicated and often unsatisfactory. Often it is impossible to use such solutions because the substrate to be coated is sensitive to the solvent, but in any case the solvent vapors present the user with problems concerning environmental pollution and hygenic working conditions, which can be solved only at great expense, if at all. Furthermore, even the unavoidable losses of solvent through evaporation make the use of such lacquers considerably more expensive. If modification of the coating is required, for example by using plasticizers or similar additives, the user is faced with further substantial difficulties.

OBJECTS OF THE INVENTION

An object of the present invention is to develop a pastable emulsion polymer having improved strength of adhesion which can be used in empasted form to coat flexible sheet-like articles.

Another object of the present invention is the development of a pastable emulsion polymer comprised of carboxylated monomer/vinyl chloride/vinyl acetate terpolymer having improved strength of adhesion produced by emulsion copolymerization and containing, per polymer weight, from 60% to 98% by weight of vinyl chloride monomer units, from 1% to 29% by weight of vinyl acetate monomer units, and from 1% to 15% by weight of carboxyl-containing monomer units selected from the group consisting of olefinically-unsaturated monocarboxylic acids, monoallyl esters of non-ethylenically-unsaturated dicarboxylic acids and monovinyl esters of non-ethylenically-unsaturated dicarboxylic acids.

A further object of the present invention is the development of a process for the production of the above pastable emulsion polymer in empasted form with plasticizers, heat stabilizers and possibly other additives, for coating flexible sheet-like articles.

These and other objects of the invention will become more apparent as the description thereof proceeds.

DESCRIPTION OF THE INVENTION

The drawbacks of the prior art can be overcome and the above objects can be achieved in a surprisingly simple manner by the paste according to the invention, which is manufactured using the above-mentioned pastable emulsion polymer comprised of carboxyl group-modified vinyl chloride/vinyl acetate terpolymers according to the invention. Surprisingly, these polymers have a distinctly better adhesion to flexible sheet-like articles, especially woven fabrics, fiber fleeces, pasteboard, paper and films, as well as to glass and metal, than do the known modified polymers and they have at least the same degree of adhesion as do combinations of conventional PVC paste and a system of adhesion-imparting agents. Such systems of adhesion-imparting agents are usually undesirable because of their generally short pot life and great sensitivity to environmental influences such as entry of air and moisture, during processing. An example of such a system of adhesion-imparting agents is a combination of branched polyesters and diisocyanates.

If the adhesion values that would be achieved with the concomitant use of such systems of adhesion-imparting agents–which, however, make the coating operation much more expensive because of the considerably greater amount of work and investment required–can be obtained without such expense, then that represents a considerable technical advance.

Particularly good results are obtained on flexible sheet-like articles, for example woven fabrics or fiber fleeces of natural and/or synthetic fibers, for example polyesters, polyamides, polypropylene, etc.

The pastes manufactured from the readily pastable carboxyl group-modified vinyl chloride/vinyl acetate terpolymers according to the invention have properties and processibility that are as good as, or in some cases even better than, those of conventional pastes. Thus, in contrast to combination of PVC paste and adhesion-imparting agents, pastes having the composition according to the invention have good storage-stability and also exhibit pseudoplastic flow behavior so that, after they have been applied to the substrate, they do not drip or run off.

A high degree of homogeneity of the polymers is necessary in order to achieve the advantages indicated. Accordingly, the terpolymer according to the invention is manufactured by the copolymerization of from 60% to 98% by weight, preferably from 78% to 97% by weight, especially from 83% to 97% by weight, of vinyl chloride; from 1% to 29% by weight, preferably from 1% to 20% by weight, especially from 1% to 15% by weight, of vinyl acetate; and from 1% to 15% by weight, preferably from 2% to 10% by weight, especially from 2% to 8% by weight, of carboxyl group-containing monomers, in aqueous emulsion by means of free-radical-forming catalysts that are preferably water-soluble, in conventional quantities of preferably from 0.001% to 1% by weight, based on the monomers in the presence of up to 6% by weight, preferably from 0.1% to 2% by weight, based on the monomers, of emulsifiers and, optionally, protective colloids and other conventional additives, which may optionally be added in the usual quantities.

The monomers vinyl chloride and vinyl acetate, introduced in the same way as are the other polymerization additives, can be metered in partially or completely during the course of the polymerization. Since it is particularly important that the carboxyl group-containing monomer units, preferably units from $\alpha,\beta$-unsaturated monocarboxylic acids, be incorporated by polymerization in a uniform manner, the carboxyl group-containing monomer is metered in accordance with the rate at which it is consumed. If it is added too quickly, the stability of the emulsion may be impaired. The manner of incorporation influences not only the adhesion values but also the pastability and the flow behavior of the paste.

The monocarboxylic acid preferably used may be particularly $\alpha,\beta$-alkenoic acids having from 3 to 6 carbon atoms. The monoallyl or monovinyl esters are preferably esters of alkanedioic acids having from 4 to 8 carbon atoms. The preferred monocarboxylic acid may be also partly replaced by monoallyl/or monovinyl esters of non-ethylenically unsaturated dicarboxylic acids; complete replacement is also possible. However, a terpolymer of vinyl chloride, vinyl acetate and monoethylenically-unsaturated monocarboxylic acid, in which the monocarboxylic acid is replaced by the other monomers mentioned to an extent not exceeding 20% by weight, based on the monocarboxylic acid, is preferred.

Preferred carboxyl group-containing monomers are crotonic acid, isocrotonic acid, acrylic acid and methacrylic acid, the latter two being especially preferred.

The desired adhesion and the desired paste viscosity can be controlled by controlling the quantity of carboxyl group-containing monomers incorporated by polymerization (within the specified range): both parameters increase as the content of carboxyl groups in the polymer increases.

The polymers can be processed particularly well to form the paste according to the invention which can be used particularly well for coating, when the polymers have K values according to Fikentscher of from 60 to 80, especially of from 65 to 75. The pastable emulsion polymers of the invention generally have a composition corresponding substantially to that of the monomer phase, for example approximately 60% to 98% by weight of vinyl chloride, 1% to 29% by weight of vinyl acetate and 1% to 15% by weight of carboxyl-containing monomer units.

The empasted polymers can be gelled uniformly and well at surprisingly low temperatures and already exhibit very good adhesion to the substrate material after gelling at these low temperatures, for example at approximately 130° to 140° C. The low gelling temperatures are particularly important for substrates of plastics materials, which may, for example, also be foamed, since thermal damage to the substrate can thereby be avoided.

The polymerization process according to the invention can be carried out discontinuously or continuously, and with or without the use of a seed latex. From 1% to 10% by weight, based on the monomers, of polyvinyl chloride (PVC) are optionally added as a seed latex.

Possible free-radial forming catalysts are the peroxidic compounds, which are preferably water-soluble, normally used in emulsion polymerization, for example sodium, potassium and ammonium peroxydisulfate and hydrogen peroxide. These compounds are preferably used in combination with reducing substances and, optionally, metal salts, mainly of heavy metals, for example copper, as additional activators. The reducing component of such systems, which are generally referred to as redox catalysts, may be, for example, water-soluble salts, such as bisulfites, thiosulfates, nitrites, sulfoxylates, the latter being especially in the form of formaldehyde adducts, and also organic acids, such as ascorbic acid, and also hydrazine and hydroxylamine.

The polymerization emulsifiers may be any compounds conventionally used as such in emulsion polymerization. Anionic emulsifiers, for example alkali metal and ammonium alkylsulfonates, alkylarylsulfonates, alkyl sulfates and alkyl ether sulfates, fatty acid soaps, sulfosuccinic acid esters or amides, or combinations of these compounds, are preferably used, optionally together with conventional protective colloids, which may be used in the customary quantities, or with nonionic emulsifiers. The dispersion auxiliaries are preferably added in the smallest possible quantities, especially up to approximately 1% by weight, based on the monomers, because polymers having better adhesion values are thereby obtained.

Polymerization is usually carried out in the pH range set by the carboxyl group-containing monomers used, for example at approximately pH 2 to 7, especially pH 3 to 6. It is also possible to add conventional buffer substances, for example phosphates, carbonates, acetates, borates, etc. or mixtures thereof, and the salts of polybasic acids, including hydrogen salts, for example sodium dihydrogen phosphate, dipotassium hydrogen phosphate, potassium bicarbonate, etc.

The polymer dispersion, which is generally formed in the form of a latex, is worked up by spray drying or roll drying, optionally with subsequent milling of the polymer, preferably by spray drying.

The polymers according to the invention can be proccessed particularly advantageously to form pseudoplastic pastes which, for their part, are particularly prefered for coating flexible sheet-like articles, such as, for example, woven fabrics or fiber fleeces of natural and/or synthetic fibers, paper, pasteboard and films.

The pastes are manufactured in a manner known per se, preferably from 100 parts by weight of the terpolymer according to the invention or mixtures of such terpolymers; from 10 to 100 parts by weight of at least one plasticizer selected from the group of highboiling esters of carboxylic acids or phosphoric acid, for example the full esters of sebacic, terephthalic, phthalic, azelaic and phosphoric acid with long-chained alkanols, especially those with from 6 to 18 carbon atoms, or with optionally alkyl-substituted phenols having from 1 to 18 carbon atoms in the alkyl; from 0 up to approximately 10 parts by weight of commercial heat stabilizers, for example heavy metal salts, such as, for example, commercial lead/cadmium stabilizers, and from 0 up to approximately 10 parts by weight of other conventional additives, for example dyestuffs, pigments, fillers, UV-absorbers, and the like.

The following examples of products that can be manufactured using the pastes according to the invention (for example by coating, spraying or immersion) demonstrate the surprisingly broad range of possible use of these pastes: synthetic leather, awnings, table cloths, floor coverings, wall coverings, etc. The coating operation is carried out particularly advantageously in continuously operating coating installations. The substrate may be coated directly or indirectly by means of an auxiliary carrier.

EXAMPLES

The following examples and comparison tests further illustrate the invention.

Comparison Test A

The following were placed in a 400 liter reaction vessel:
130 kg of deionized water,
100 kg of vinyl chloride,
3.3 kg of PVC seed latex having a particle size of 0.2 μm and a solids content of 40% by weight, based on the seed latex dispersion added,
2 kg of 15% by weight aqueous ammonium laurate solution,
50 gm of potassium persulfate.

Heating was effected to 54° C. and polymerization was carried out at a stirrer speed of 75 min$^{-1}$ until the pressure started to fall, a further 8 kg of the 15% by weight ammonium laurate solution being metered in continuously over a period of 8 hours during the course of this operation. The emulsion obtained had a solids content of 37% by weight. After spray-drying the emulsion (spraying by means of a binary nozzle, Nubilosa system), a pastable emulsion polymer product was obtained having a K value of 68.4 (0.5 gm/100 cm$^3$ in cyclohexanone at 25° C.).

A paste consisting of 3 parts of the above PVC and 2 parts of dioctyl phthalate had, after 2 hours, a viscosity of 5200 mPas at a shearing rate of 4 sec$^{-1}$ (Brookfield viscosimeter, 20 min$^{-1}$, 25° C.).

The adhesion values obtained with this paste product on polyester and polyamide films are given in Table 1.

Comparison Test B

The following were placed in a 400 liter reaction vessel:
130 kg of deionized water,
95 kg of vinyl chloride,
5.5 kg of vinyl acetate,
1.5 kg of a 10% aqueous solution of sodium dihexyl sulfosuccinate (Aerosol MA (registered Trade Mark) manufactured by American Cyanamid).
50 gm of potassium persulfate.

After heating to 54° C., polymerization was carried out at a stirrer speed of 75 min$^{-1}$ for approximately 9 hours at a constant temperature until the pressure started to fall. During the course of this operation, a further 8.5 kg of dihexyl sulfosuccinate (10% by weight aqueous solution) were metered in over a period of 8 hours. The emulsion obtained had a solids content of 37.2% by weight. The polymer had a K value of 68.2. Working up was carried out as in Comparison Test A.

The viscosity of the paste produced according to Comparison Test A was measured analogously to Comparison Test A and found to be 21 000 mPas. The adhesion values are given in Table 1.

EXAMPLE 1

The following were placed in a 400 liter reaction vessel:
130 kg of deionized water,
95 kg of vinyl chloride,
5.5 kg of vinyl acetate,
1.5 kg of sodium dihexyl sulfosuccinate (10% by weight aqueous solution),
70 gm of ammoniun acetate,
50 gm of potassium persulfate.

After heating to 54° C., polymerization was carried out at a stirrer speed of 75 min$^{-1}$ for approximately 9 hours at a constant temperature until the pressure began to fall. During the first 8 hours, 3 kg of acrylic acid and 8.5 kg of sodium dihexyl sulfosuccinate (10% by weight aqueous solution) were metered in continuously. The solids content of the emulsion obtained was 37.5% by weight. Working up was carried out analogously to Comparison Test A. The K value was 67.9 and the viscosity of the paste (prepared and determined analogously to Comparison Test A) was 17 000 mPas. The adhesion values are given in Table 1.

EXAMPLE 2

The procedure of Example 1 was repeated with the modification that a 10% by weight aqueous solution of ammonium lauryl sulfate (Texapon ® K12) was used instead of the 10% by weight aqueous sodium dihexyl sulfosuccinate solution.

The K value of the polymer was 67.7 and the viscosity of the paste was 19 000 mPas.

Comparison Test C

The procedure of Example 1 was repeated with the variation that 3 kg of maleic acid was metered in instead of the acrylic acid. After 23 hours, a conversion of 65% was obtained. The K value of the polymer was 68.2 and the viscosity of the paste prepared in Comparison Test A was 17 000 mPas. The adhesion values are again given in Table 1.

EXAMPLE 3

Investigation of the adhesion values

In order to measure the adhesion properties, the product was applied as a PVC paste, in a strip 35 mm wide and 1 mm thick, to polyester films (Hostaphan ® RN 190 manufactured by Hoechst AG, Frankfurt-/Main, Federal Republic of Germany) or polyamide films (Supronyl ® N 200 manufactured by Kalle, Wiesbaden, Federal Republic of Germany) and gelled for 5 minutes at 145° C. Composition of the paste:
100 parts by weight of spray-dried polymer,
65 parts by weight of dioctyl phthalate, and
2 parts by weight of stabilizer Nuostab ® V 1277 (Ba/Cd liquid), manufactured by Siegle, Augsburg, Federal Republic of Germany.

The adhesion values of the gelled pastes on the polyester and polyamide film were expressed by the peeling force required to pull the strip off the film. The average peeling force was determined from the integral value of the peeling force over the length of the strip to be peeled off (peeling angle 180°). Table 1 gives the average values of, in each case, 3 measurements.

Table 1

Adhesion of completely gelled coatings of pastes prepared from polymers manufactured in accordance with the examples and comparison tests (peeling force in newtons).

| Pastes Prepared From Polymers of Examples or Comparisons | Polymer | Polyester Film | Polyamide Film |
| --- | --- | --- | --- |
| A | PVC | 1.3 | 0.4 |
| B | PVC/PVAC | 1.4 | 0.7 |
| B+ | PVC/PVAC | 4.0 | 0.9 |
| 1 | PVC/PVAC/PAC | 4.6 | 5.0 |
| 2 | PVC/PVAC/PAC | 4.8 | 7.0 |
| C | PVC/PVAC/PMA | 3.4 | 2.6 |

These results clearly demonstrate the improved strength of adhesion of the gelled pastes prepared from the pastable emulsion polymers of the invention.

The preceding specific embodiments are illustrative of the practice of the invention. It is to be understood however, that other expedients known to those skilled in the art or disclosed herein may be employed without departing from the spirit of the invention or the scope of the appended claims.

We claim:

1. A paste capable of being gelled at low temperatures consisting essentially of:
   100 parts by weight of a pastable emulsion polymer comprised of carboxylated monomer/vinyl chloride/vinyl acetate terpolymer having improved strength of adhesion produced by emulsion copolymerization and containing, per polymer weight,
   from 60% to 98% by weight of vinyl chloride monomer units,
   from 1% to 29% by weight of vinyl acetate monomer units, and
   from 1% to 15% by weight of carboxyl-containing monomer units selected from the group consisting of olefinically-unsaturated monocarboxylic acids, monoallyl esters of non-ethylenically-unsaturated dicarboxylic acids and monovinyl esters of non-ethylenically-unsaturated dicarboxylic acids, and recovered by spray drying or roll drying,
   from 10 to 100 parts by weight of at least one plasticizer selected from the group consisting of esters of alkanols having from 6 to 18 carbon atoms or phenols or alkylphenols having from 1 to 18 carbon atoms in the alkyl with dicarboxylic acids or phosphoric acid,
   from 0 to 10 parts by weight of heat stabilizers and
   from 0 to 10 parts by weight of additives selected from the group consisting of dyestuffs, pigments, fillers and UV-absorbers.

2. The paste of claim 1 wherein said carboxyl-containing monomer units are selected from the group consisting of $\alpha,\beta$-alkenoic acids having from 3 to 6 carbon atoms, monoallyl esters alkanedioic acids having from 4 to 8 carbon atoms and monovinyl esters of alkanedioic acids having from 4 to 8 carbon atoms.

3. The paste of claim 1 or 2 wherein said vinyl chloride monomer units are present in an amount of from 78% to 97% by weight, said vinyl acetate monomer units are present in an amount of from 1% to 20% by weight, sand said carboxyl-containing monomer units are present in an amount of 2% to 10% by weight.

4. The paste of claim 1 or 2 wherein said vinyl chloride monomer units are present in an amount of from 83% to 97% by weight, said vinyl acetate monomer units are present in an amount of from 1% to 15% by weight, and said carboxyl-containing monomer units are present in an amount of 2% to 8% by weight.

5. The paste of claim 1 wherein said carboxyl-containing monomer units are olefinically unsaturated monocarboxylic acids.

6. The paste of claim 2 wherein said carboxyl-containing monomer units are $\alpha,\beta$-alkenoic acids having from 3 to 6 carbon atoms.

7. The paste of claim 6 wherein said $\alpha,\beta$-alkenoic acids having from 3 to 6 carbon atoms is acrylic acid.

* * * * *

UNITED STATES PATENT AND TRADEMARK OFFICE
CERTIFICATE OF CORRECTION

PATENT NO. : 4,348,496
DATED : Sept. 7, 1982
INVENTOR(S) : RUDOLF PUHE et al

It is certified that error appears in the above-identified patent and that said Letters Patent are hereby corrected as shown below:

Column 7, line 45, the following has been inserted after the table.

+ with the addition of a commercial adhesion-imparting agent based on polyester and diisocyanate: 4 parts by weight of adhesion-imparting agent TN, 3 parts by weight of Desmodur® N 75. This additive was incorporated into the above paste composition.

PVC = polyvinylchloride

PVC/PVAC = vinylchloride/vinylacetate copolymer

PVC/PVAC/PAC = vinylchloride/vinylacetate/acrylic acid terpolymer

PVC/PVAC/PMA = vinylchloride/vinylacetate/maleic acid terpolymer

Signed and Sealed this

Sixth Day of March 1984

[SEAL]

Attest:

*Attesting Officer*

GERALD J. MOSSINGHOFF

*Commissioner of Patents and Trademarks*